July 1, 1924.
C. T. PFLUEGER ET AL
1,499,689
ARTIFICIAL BAIT
Filed Aug. 7, 1919
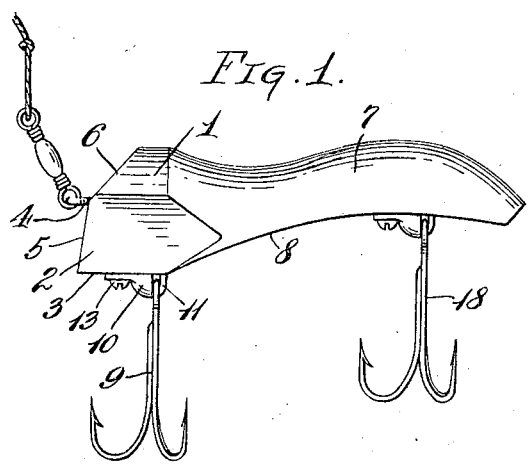
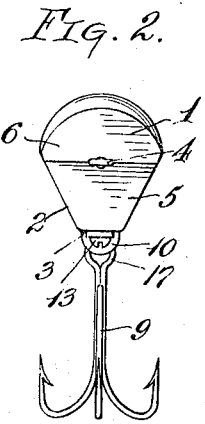
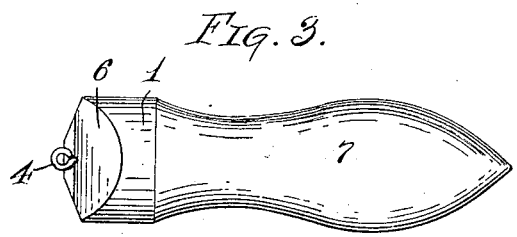
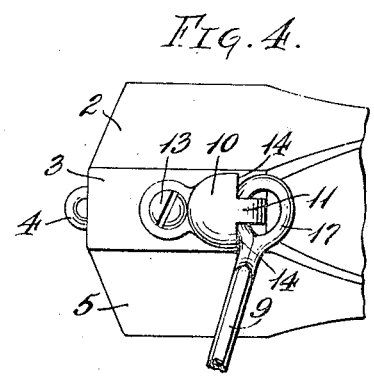
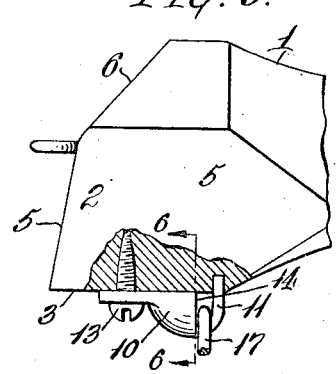
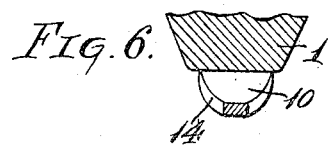
Inventors.
Charles T. Pflueger and
Walter L. Adams.
By Brockett and Hyde
Attys.

Patented July 1, 1924.

1,499,689

UNITED STATES PATENT OFFICE.

CHARLES T. PFLUEGER AND WALTER L. ADAMS, OF AKRON, OHIO, ASSIGNORS TO THE ENTERPRISE MANUFACTURING COMPANY, OF AKRON, OHIO, A CORPORATION OF OHIO.

ARTIFICIAL BAIT.

Application filed August 7, 1919. Serial No. 315,870.

*To all whom it may concern:*

Be it known that we, CHARLES T. PFLUEGER and WALTER L. ADAMS, citizens of the United States, residing at Akron, in the county of Summit and State of Ohio, have invented certain new and useful Improvements in Artificial Bait, of which the following is a specification.

This invention relates to fishing tackle and particularly to an artificial minnow used as a bait and to hook attaching devices used therewith.

In the specific embodiment shown the minnow comprises a body portion, having downwardly converging sides, forming a keel portion, a front end inclined upwardly backwardly in two planes and a lobe shaped tail portion with a longitudinally extending upwardly curved and transversely flat under face. The minnow is provided with a suitable hook attaching device or devices for supporting a hook or hooks and an eye, at the junction of the two inclined planes at the front end, to which the line may be attached.

Further features of invention will more fully and at large appear from the following description, drawings and claims.

Referring to the drawings, Fig. 1 is a side elevation of the device; Fig. 2 is a front end elevation; Fig. 3 is a top plan view; Fig. 4 is a bottom plan view of the forward end showing the hook attaching device; Fig. 5 is a side elevation, partly in section, of the forward end of the minnow, showing the hook attaching device; and Fig. 6 is a detail section on the line 6—6, Fig. 5.

In the drawings, 1 represents the main body portion, the upper half of which is of semi-cylindrical form arched laterally and the lower half of which may be provided with downwardly converging sides 2 which meet a narrow flat bottom portion 3, as shown in Fig. 4 in substantially V-form, although this is not essential. The front end of the body portion 1 is provided with a line attaching eye 4 and the front end of the body portion is inclined downwardly and forwardly to form the plane face 5 below the attaching eye, and above the attaching eye inclined rearwardly and upwardly to form the inclined face 6.

Extending to the rear of the body portion is a tail portion 7 preferably in the form of an elongated symmetrical lobe having a rounded upper portion and an upwardly extending rearwardly arched or curved plane face 8 on its lower surface. This face 8 extends from the flat portion 3 to a point near the end of the tail portion. The rear end of the tail portion is pointed so as to permit the device to move freely through the water without stirring up a back wash or eddy current. The various structural features of the bait body all contribute to produce a unique motion as the bait travels through the water. This motion is as though the front or body portion of the minnow moved along a practically straight line while the tail portion wobbles from side to side as though it is pivoted about a vertical axis near the front of the bait body. Regardless of the speed of travel through the water the waves of the sinuous path described by the tail are comparatively short and close together, as distinguished from the long waves or curves of the average bait of this class. The lateral motion of the tail is probably due in some measure to its laterally extending horizontal plain under surface, coupled with the longitudinal arching or curving of said surface, while the keel depending as it does below the said under tail surface assists in balancing the bait and preventing it from turning from one side to the other around a longitudinal horizontal axis.

Below the flat portion 3 is a hook 9 secured to this flat portion by a clip comprising a hollow base 10 and hook receiving tongue 11 having its free end imbedded in the material of the body portion of the minnow. The clip is held in place by a screw 13 passing through the base. The hook receiving tongue 11 cooperates as a guard with the vertically disposed edges 14 of the hollow base 10, which edges are arranged in a plane substantially at right angles to the plane of the base. The device is secured to the minnow with the tongue 11 toward the rear, whereby when the eye 17 of the hook is applied thereto it is free to swing to the rear and to the sides and is prevented from swinging forward beyond the plane of the edges 14 of the guard, as shown in Fig. 4. This feature is of great importance inasmuch as it prevents, in a two hook construction, the rear hook from swinging forward and becoming entangled with the forward hook, and also prevents the forward hook from swinging to the front and becoming entangled with the line. It is obvious that this guard does not prevent the movement of the hook in all necessary directions.

Another hook 18 may be provided on the minnow and it is preferably arranged upon the flat face 8 near the rear. It may be secured in any suitable way as by one of the clips already described.

When the minnow is attached to the line and is drawn through the water it sinks to a suitable depth and wiggles or wobbles first in one direction and then in the other and forms an alluring bait for the fish.

Having described our invention, we claim:

1. A bait, comprising a body portion having a keel portion provided with straight longitudinally extending downwardly converging inclined side surfaces, and a rearwardly extending tail portion, said keel portion depending below the tail portion.

2. A bait, comprising a body portion having a keel portion provided with straight longitudinally extending downwardly converging inclined sides, and a rearwardly extending tail portion having its lower face arched.

3. A bait, comprising a body portion having an upper transversely curved surface and a downwardly extending keel portion having flat converging side faces, said body portion also having its front end provided with an upwardly and rearwardly extending surface, and a tail portion having its lower face arched rearwardly.

4. A bait, comprising a body portion having an upper transversely curved surface and a downwardly extending keel portion having flat converging side faces, said body portion also having its front end provided with upwardly and rearwardly extending faces in two planes, a line securing eye at the front of said body portion, and a tail portion formed integral with said body portion and having an arched lower face.

5. A bait, comprising a body portion and a rearwardly extending tail portion, said body portion at its front end having a keel portion depending below the lower surface of said tail portion.

6. A bait, comprising a body portion and a rearwardly extending tail portion, said body portion at its front end having a keel portion depending below the lower surface of said tail portion, said tail portion having its lower surface in the form of a laterally extending horizontal plane causing the tail portion to have lateral wobbling motion as the bait travels through the water.

7. A bait, comprising a body portion and a rearwardly extending tail portion, said body portion at its front end having a keel portion depending below the lower surface of said tail portion, said tail portion having its lower surface in the form of a laterally extending horizontal rearwardly arched plane causing the tail portion to have lateral wobbling motion as the bait travels through the water.

In testimony whereof we affix our signatures.

CHARLES T. PFLUEGER.
WALTER L. ADAMS.